United States Patent [19]

Radcliffe, Jr.

[11] 3,818,443

[45] June 18, 1974

[54] SIGNATURE VERIFICATION BY ZERO-CROSSING CHARACTERIZATION

[75] Inventor: Arthur J. Radcliffe, Jr., Ann Arbor, Mich.

[73] Assignee: Burroughs Corporation, Detroit, Mich.

[22] Filed: Apr. 28, 1972

[21] Appl. No.: 248,414

[52] U.S. Cl. .......................................... 340/146.3 SY

[51] Int. Cl. .......................... G06k 1/08, G06k 9/00

[58] Field of Search .......... 340/146.3 SY, 146.3 SG; 346/33 TP; 178/18

[56] References Cited

UNITED STATES PATENTS

| | | | |
|---|---|---|---|
| 3,133,266 | 5/1964 | Frishkopf | 340/146.3 SG |
| 3,480,911 | 11/1969 | Danna | 340/146.3 SY |
| 3,579,186 | 5/1971 | Johnson | 340/146.3 SY |
| 3,618,019 | 11/1971 | Nemirovsky | 340/146.3 SY |

*Primary Examiner*—Paul J. Henon
*Assistant Examiner*—Leo H. Boudreau
*Attorney, Agent, or Firm*—Michael B. McMurry; Russel C. Wells; Edwin W. Uren

[57] ABSTRACT

A method and apparatus for establishing a representation of a standard signature from a plurality of substantially identical signatures wherein said representation is to be used on an identification card. The signature pattern of pressure levels is convolved into a pattern which is a representation of the probability curve that at a predetermined time in a signature there will be a pressure increase. The method for establishing a data base for a special purpose digital computer is also taught.

2 Claims, 7 Drawing Figures

SIGNATURE VERIFICATION BY ZERO-CROSSING CHARACTERIZATION

BACKGROUND OF THE INVENTION

In our present society merchants in the conduct of their business have a problem of positively identifying customers when required to operate within age statutes or in financial transactions. Often times it is necessary for the customer to present to the merchant a plurality of identification cards to provide his identity and if necessary his age. Many times it is necessary that the customer produce an identification card having his picture affixed thereon in such a manner that to the merchant the picture is semiofficial and was attached by the legitimate issuer of the card. However, to the individual who desires to represent himself as another individual, a plurality of identification cards including having his own picture affixed thereon are easy to obtain.

One of the oldest forms of identification is by the signature of the individual where that signature is compared with a document having a previous signature thereon, which document is usually issued by a governmental agency. Here again, the ease of forging a signature by a skilled individual allows the merchant to catch only those who are amateurs. Often times a valid signature is turned down because at the time of signing the present signature, the individual in writing in less than ideal conditions compared to the conditions present when signature, which is on his official document, was made.

The problem of discerning between a forged card and a valid signature is a problem that has had many attempted solutions. However, many of the attempted solutions have failed by either rejecting a high percentage of valid signatures in order to catch the occasional forgery resulting in embarassment to the holder of the valid signature. Other times in order to avoid the embarassment to the holder of a valid signature the rejection rate is low allowing the expert forger to pass his forged signature as a valid signature.

A signature has many different characteristics which vary from individual to individual. These characteristics may or may not be apparent to one, such as a merchant, when he is deciding between a valid and a forged signature. One such characteristic is the appearance of the signature. Generally an experienced forger can make the appearance of his forged signature substantially identical to the valid signature which he is attempting to pass. Another characteristic is the signature length. Again, an experienced forger through practice and in perfecting the appearance of the signature will have the length of the signature substantially equal to that of the valid signature. A third characteristic is the slope of the several letters within the signature which as in the previously two characteristics an expert forger will have no trouble duplicating.

A fourth characteristic is that of pressure applied by the signer during the signing of his signature. This type of characteristic is not discernible to one who is merely looking at a signature on a piece of paper or some other recording means. But this characteristic of the pressure applied is a characteristic which is significantly consistent for a given person. Pressures of course may vary somewhat when the writing arm has some form of disability. It is to the pressure characteristic of a signal that the invention to be described herein is addressed.

SUMMARY OF THE INVENTION

It is a principle object to provide a method to create a valid signature representation according to the pressures applied during signing.

It is another object of the present invention to provide a system for recording the pressure characteristics of a signature as a permanent record.

It is another object of the present invention to provide a program for a digital computer adapted to calculate the convolved distribution pattern of the pressure characteristics of a signature.

These and other objects will become apparent and the following description wherein a method for generating a reference signature representation for use in a signature verification system is disclosed. The reference signature representation is compared with the inquiry or present signature the validity of which is to be checked to determine whether the user or the holder of the inquiry signature is the same individual who made the reference signature representation. To create the reference signal representation, an individual generates a plurality of electrical signals each of which is responsive to the handwriting pressure as said individual signs a plurality of substantially identical signatures. Each of said electrical signals are then sampled at predetermined intervals over a predetermined period of time to determine the presence of a predetermined characteristic. The presence of said predetermined characteristic is then stored as a binary encoded digital signal as a first signal and the absence of said characteristic is stored as a second signal. Each of said electrical signals is also measured to determine the actual time length of said signals. From each actual time length of each of said electrical signals, an average time length is generated to represent all of said electrical signals. Each of said predetermined characteristic is then time-smeared to define the probability of the occurrence of each of said characteristic in adjacent and contiguous sampling intervals. Each of said electrical signals with its weighted probability value is then combined into a distribution pattern representing the probability of occurrence of said predetermined characteristic of each of said electrical signals. Each convolved pattern is then normalized to the average length of the several patterns and from each of said electrical signals an average distribution pattern is determined. The average distribution pattern is then stored for reproduction as an electrical signal representing the reference signature of an individual and said pattern is then compared with the inquiry signature of said individual to determine the validity thereof.

DETAILED DESCRIPTION

Figure 1:
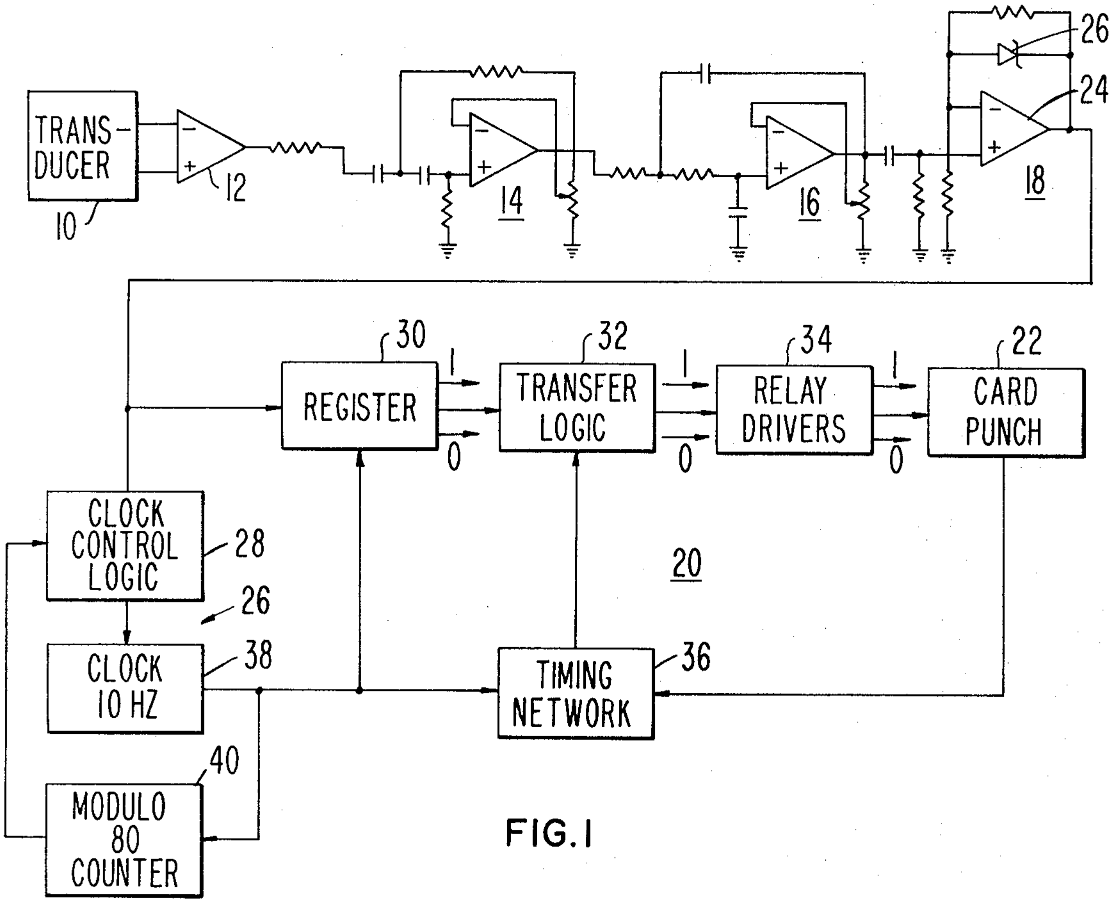
FIG. 1 is a block schematic of a system for generating a permanent record of a signature pattern.

Referring to the Figures by the characters of reference, there is illustrated in FIG. 1 a schematic block diagram of a system for generating a permanent record of the pressure characteristic of a signature. The output of the system illustrated in FIG. 1 is a card punch machine which is programmed so that one card carries the information for one signature. As will hereinafter be shown in the preferred embodiment, the punched card to be used is a 80-column card and the signature is divided or sampled 80 times. The result of each sampling is stored by the presence or absence of a punch hole in each column of the card.

The system illustrated in FIG. 1 may be contained in one physical location or portions of it may be cable connected to each other and physically located at different locations.

The schematic portions of FIG. 1 illustrates the general circuitry required to process the typically low level electrical signals generated by a pressure responsive transducer 10 by passing these signals through several stages of amplification 12, filtering 14 and 16 and shaping 18. The output signal which is a square wave is then applied to logic circuitry such as that found in digital computers. As illustrated in FIG. 1, the output of the transducer 10 is applied to the input of an amplifier 12 having as its main element an operational amplifier. The output of the amplifier 12 is then passed through a band pass filter section comprising a high pass filter 14 and a low pass filter 16 for removing the unwanted frequencies at both ends of the frequency spectrum. The output of the band pass filter section 14 and 16 is then supplied to a limiter 18 or shaper circuit whose output is a plurality of square waves having a constant amplitude. These square wave signals are then applied to the logic circuitry of a special purpose computer 20 for generating the required output signals for operating a card punch machine 22.

The pressure responsive transducer 10 as illustrated in block or schematic form in FIG. 1 may be any one of many physical forms. Commonly such pressures sensitive transducers 10 are strain gages mounted in the familiar bridge circuitry and responsive to deflections of the structure upon which they are mounted. These deflections in response to the pressure applied by one signing his signature. An example of one such instrument is disclosed in U.S. Pat. No. 3,528,295 issued to R. R. Johnson, et al., entitled Stylus With Pressure Responsive Transducer which is assigned to the same assignee as the present invention. In that particular patent the writing instrument or stylus has contained therein a strain gage which forms one side of a bridge circuit. As the signature is being made, the pressure being applied to the writing tip of the stylus is transformed into electrical signals by means of a strain gage.

Another pressure sensitive responsive transducer device is such as that disclosed in U.S. Pat. No. 3,563,097 issued to E. O. Roggenstein, et al., and entitled Conversion of Handwriting Into Electrical Signals which is assigned to the same assignee as the present invention. This particular patent discloses and claims a writing platform upon which are mounted strain gages which are responsive to the pressure applied to the writing platform by an individual signing his name. In such a device the writing instruments may be a standard ballpoint pen or the like and the platform upon which the signature is being written deflects according to the amount of pressure applied thereto. The deflection is measured by the strain gages which are mounted in a bridge circuit thereby generating an electrical signal responsive to the amount of deflection of the table.

Regardless of the type of pressure responsive transducer used by they either the two aforementioned devices, for the purposes of this disclosure the transducer 10 converts pressure into analog electrical signals and supplies the electrical signals to the amplifier 12 illustrated in FIG. 1. In the particular embodiment, the output of the transducer 10 is in the range of millivolts and more particular in the order of 1 or 2 millivolts, which signal must be amplified to be useful. The gain in the amplifier 12 in the preferred embodiment is 50 therefore, the output of the amplifier is on the order of 50 to 100 millivolts.

The output of the amplifier 12 is an analog signal superimposed on a direct current voltage level. In the preferred embodiment, the first filter 14 is a high pass active filter having a gain of 10 for passing all frequencies above 2 hertz. The next filter 16 which is a low pass active filter having a gain of 10, rejects all frequencies from the high pass filter 14 above 14 hertz.

The output of the low pass filter 16 which is on the order of several volts and in the preferred embodiment is approximately 5 volts is supplied to a limiter-shaper circuit 18 for generating square wave signals from the analog signal. As illustrated in FIG. 1, the active element of the limiter circuit is an operational amplifier 24 having a zener diode 26 in the feedback of the amplifier 24. The zener diode 26 controls the output signal of the limiter 18 through a range, which in the preferred embodiment, is between 0 and + 5 volts as required by DTL logic of the computer 20. The input frequencies of the analog signal to the limiter 18 is between 2 and 14 hertz. The gain of the limiter 18, which is 100, assures that sharp rise times, corresponding to the slope of each cycle of the input signal are presented to the logic circuits of the computer 20.

Figure 4:
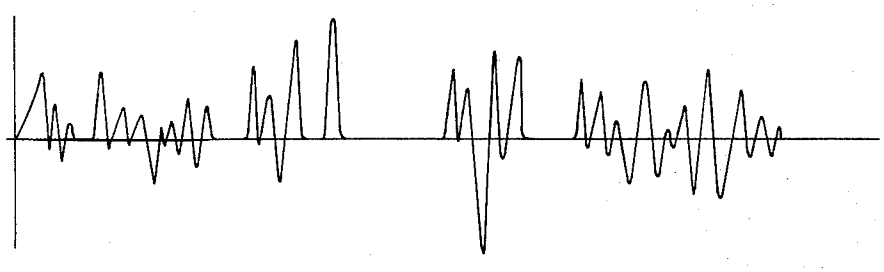
FIG. 4 is the filtered waveform of the waveform of FIG. 3.

The purpose of the high pass filter 14 is to remove the direct current voltage level component of the pressure responsive electrical signal as generated by the transducer. This centers the waveform of the analog signal on a zero axis as indicated in FIG. 4. The low pass filter 16 rejects noise and all non-significant frequencies present in the waveform above 14 hertz. The output of the limiter 18 is a plurality of square wave signals wherein the leading edge of each signal corresponds to the positive slope of each cycle of the analog signal as it crosses the zero axis from the transducer 10.

As indicated, the logic of FIG. 1 is for preserving the signature on a punched paper card. To accomplish this, the output of the limiter circuit 18 is supplied to a digital logic network of a computer 20 controlling a card punch machine 22. The network comprises a clocking system 26 including its control logic 28, a register 30 for receiving the signals from the limiter 18, and means 32 for converting the output of the register 30 for driving relays 34 necessary for energizing the punches in the card punch 22. Coordinating the several component sections of the logic network is a timing network 36 that is responsive to both the clocking system 26 and the card punch 22.

In the preferred embodiment, the frequency of the clock 38 in the closing system 26 is a 10 hertz. As will be shown for each signal from the clock 38, the punched card is advanced one column. As previously indicated, the punched card is a 80-column punched or Holerith card, therefore, a modulo 80 counter 40 is used to control the clock control logic 28. The clock control logic is responsive to the first signal from the limiter 18 of the signature being written, to initiate the operation of the clock 38 and is also responsive to the modulo 80 counter 40 to turn off the operation of the clock 38 at the end of 80 clock pulses. The output of the clock is supplied to the modulo 80 counter 40 for incrementing the counter and is also supplied to the register 30 and to the timing network 36.

The output of the limiter 18 is supplied to the register 30 which in the preferred embodiment is a flip flop wherein the limiter output is supplied to the set terminal of the flip flop and the clock 38 is applied to the reset terminal of the flip flop. The register 30 is responsive to the positive going or positive slope of the leading edge of the signals from the limiter and will change state to the one output whenever the input to the register 30 receives a set signal. As is conventional the output of the flip flop register is a one or zero signal indicating the presence or absence, respectively, of a leading edge signal from the limiter 18 during the interval between successive clock pulses.

The output of the flip flop or register 30 is supplied to transfer logic means 32 for activating either one of two punches in the card punch unit. In the preferred embodiment if the flip flop 30 becomes set the output of the flip flop is a one output which will activate a punch corresponding to row one in a standard 80-column punched card. In a similar manner if the output of the flip flop 30 is zero, the logic means will activate the punch for punching row zero in the 80-column card. Except for exceedingly brief intervals of time between when the input to the flip flop or register receives a positive going signal from the subsequent time it receives a clock signal, the row one punch will be activated.

As illustrated in FIG. 1, the timing network 36 controls the transfer of information from the register 30 through the logic means 32 to the card punch 22 in response to the output of the clock. The timing network 36 is also synchronized with the movement of the punch card through the punching station of the card punch 22.

The above described logic causes the punch to be activated in row one of each column of the punched card whenever the analyzed signal generated by the pressure responsive transducer 10 crosses the zero axis of the signal as illustrated in FIG. 4. If during one of the intervals between successive clock pulses, there is no positive going zero crossing of the axis by the signal, a punch will be activated to punch row zero in that particular column being scanned. As indicated above, each signature is scanned at a rate of 10 times per second and is scanned for a total time period of 8 seconds. Inasmuch as the average signature takes between 5 and 7 seconds to write, such a scanning will more than adequately cover all of the signature.

The above-described system may be used to generate a reference signature wherein an individual will sign his name a plurality of times in the preferred embodiment this would be five times, and each signature is recorded on a punch card. The more signatures that the individual signs and the more data gathered about his signature, the greater will be the reduction of the variable effect caused by different signatures. Once the signatures are reduced to data on the punched cards this data, identified as File F63IN, is inputed into a special purpose digital computer which is programmed to analyze the cards. The program, identified hereinafter as FORGE9, performs the many calculations on the data being entered for determining a set of criteria to be used for later comparing the resultant standard or reference signature with a present or inquiry signature. One of the criteria which the computer is programmed to determine is the average length of the signature. In essence, this is determined from the data of F63IN by examining each of the records therein and determining in which column the first row one punch is made and which column the last row one punch is made. This determination is made on each record and the average from each of these determinations is calculated to determine the average length of the individual's signature.

Another one of the determinations that is made by FORGE9 is to determine the reference signature pattern of zero crossings within the average length of the individual's signature. In each signature pattern the row one punch indicates that during that time interval a positive going slope was detected as the pressure signal crossed the zero axis. Conversely, a row zero punch indicated that either the wave shape remains on the positive side of the axis, crossed the axis on a negative slope or was on the negative side of the axis. The end result of this operation is a signature pattern of a series of ones and zeros representing the zero crossings over the length of the signature. It is necessary to manipulate each of these signature patterns with the average length figure to convert the signature pattern into the average length.

In this aspect each signature is normalized to the average length. Length normalization for each signature is achieved by multiplying the ratio of the actual length of the signature to the average length times the position number under consideration in the average length pattern. The resultant product is rounded off to the nearest full number and is used to access the appropriate position in the reference signature pattern being generated. As can be shown, the first few bit positions and the last few bit positions of the average and specified signature tend to align precisely, however, between the two end positions some of the ones and zeros will be omitted if the length of the specified signature is longer than the average length. Conversely, some of the ones and zeros will be repeated if the length of the specified signature is shorter than the average length.

Figure 2:
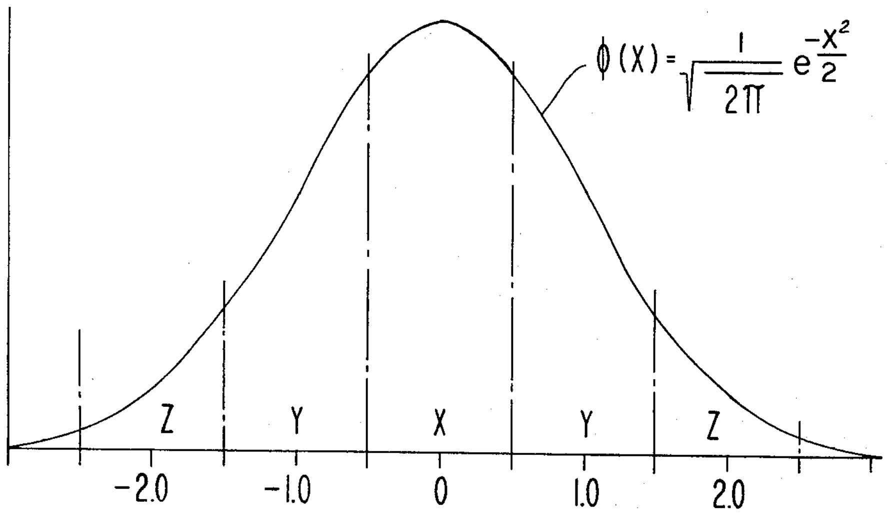
FIG. 2 is an illustration of the normal curve of error.

The nature of the system as indicated in FIG. 1 is to record zero crossings only in terms of the presence or absence of a zero crossing in an interval as determined by the clock. Therefore, a zero crossing near a time position might appear in either one of two adjacent intervals depending upon only very minute changes in the signature itself. Just a mere fact of a signature length being a little bit different may cause corresponding zero crossings to be in either one of two adjacent intervals. Therefore, in order to more appropriately define the average pattern, the event of a zero crossing it smeared to a probability of that event happening over the nominal and contiguous adjacent intervals. This snearing function is achieved by convolving the pattern according to the gaussian distribution curve of errors as illustrated in FIG. 2.

The input data or signature pattern to a computer for the convolution process is represented by a series of ones and zeros as data information as illustrated in Table A. It is desirable to change the zeros to minus ones before the convolution process takes place. Therefore, although the signature pattern was recorded as ones and zeros it is treated mathematically by FORGE9 as plus ones and minus ones.

A convolved pattern is formed from each of the input patterns from FG3IN before the input patterns are adjusted to the average length. The convolved pattern is formed by the summation in each sample position of each signature pattern of the factors of probability that a zero crossing will occur in that position. If, for example, a zero crossing was found in column 5, then the convolution process implements the probability that that particular zero crossing might appear in either column 3, 4, 5, 6 or 7. The probability that the crossing would subsequently occur in either column 4 or 6 is much higher than the probability that the zero crossing would subsequently occur in either column 3 or 7. This is illustrated in FIG. 2 by the gaussian distribution curve of error. Therefore, for each given signature each particular column or interval of that signature will have five factors to be summed to generate a convolved pattern. These five factors are (1) the probability that the zero crossing will occur in that column or in area X of FIG. 2; (2) the probability that the zero crossing will occur in either one of the two contiguously adjacent columns or in areas Y in FIG. 2; and (3) the probability the zero crossing will occur in the second column to either side of the nominal column or in areas Z in FIG. 2.

Since the computer is working mathematically with figures which are minus one and plus one, it is necessary that after convolution the pattern be normalized between zero and plus one by the addition to each column of a fixed factor representing the maximum possible negative deviation and dividing the new sum by twice that factor. The convolved pattern is generated from each of the sample signatures according to the actual length of the signature. Each actual length convolved signature pattern is then normalized to the average length as indicated above. In order to develop a true average pattern of the signature each of these patterns can then be averaged to get the average pattern for the average length of an individual's signature to get a standard or reference signature pattern.

SIGNATURE EXAMPLE

Referring to FIG. 2 there is illustrated the normal curve of error such as found in the handbook of Chemistry and Physics in the 46th edition. It is from this curve that the probability of the zero crossing occurring in an adjacent or second adjacent column is determined. As illustrated in FIG. 2 the equation for the curve is shown and through the process of integration the area under the curve between the several limits along the X-axis is found. The area X which is bounded by the limits of +0.5 and −0.5 defines the column or where the zero crossing is expected. The next adjacent columns, the areas labeled Y, are defined as the areas under the curve between +0.5 and +1.5 and between −0.5 and −1.5. The second adjacent columns, the areas labeled Z, are defined as the areas under the curve between +1.5 and +2.5 and −1.5 and −2.5.

It is found that the area labeled X in FIG. 2 is equal to 0.3830. The area labeled Y which is the adjacent column is equal to 0.2417 and the area labeled Z which is the second adjacent column is equal to 0.0606. By the use of proportions, and setting the area X equal to 1, area Y is equal to 0.63X and area Z is equal to 0.16X. For the purpose of simplifying calculations area Y is modified to 0.61 and area Z is 0.14.

Figure 3:
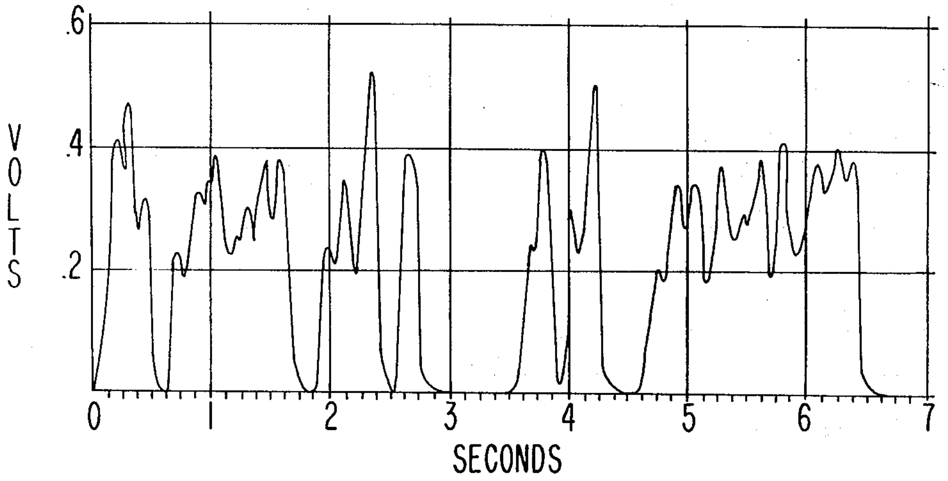
FIG. 3 is a pressure waveform of a typical signature taken at the output of the transducer of FIG. 1.

Referring to FIGS. 3–6 there is illustrated a representative signature pattern and the resultant wave shapes found at several locations in the schematic of FIG. 1. FIG. 3 portrays the output of the pressure transducer, illustrating the relative pressures used by an individual when signing his signature. The pattern of FIG. 3 represents the signature of an individual having the name of Jack E. Koppen. By analyzing the waveform one can see where the letter J in the work J is formed and then the pen is removed from the tablet and replaced to complete the rest of the name Jack. The middle initial E is then signed and the pen is lifted and placed back down to make the period. A short period of time later the K beginning the last name is written and the pen is removed and replaced for finishing the writing of the last name. In FIG. 3 the horizontal scale is labeled in seconds of time and each large vertical block is labeled in volts representing pressure. Thus it is seen that the signature Jack E. Koppen is written in 6½ seconds and the greatest amount of pressure is equivalent to approximately 0.5 volts.

FIG. 4 is the waveform of the signature pressure pattern after it has been filter to remove the unwanted frequencies above 14 hertz and below 2 hertz. Whenever the pen has been removed from the tablet during the signature, there is no waveform in FIG. 4.

Figure 5:
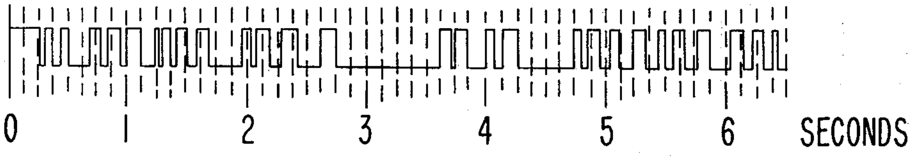
FIG. 5 is the output waveform of a positive trigger limiter in FIG. 1.

FIG. 5 is the waveform taken from the output of the limiter of FIG. 1 and illustrates the square waves due to wave shape of FIG. 3 crossing the zero axis. As previously indicated, the limiter 18 is responsive to positive going signals and will generate a square wave in response thereto.

Figure 6:
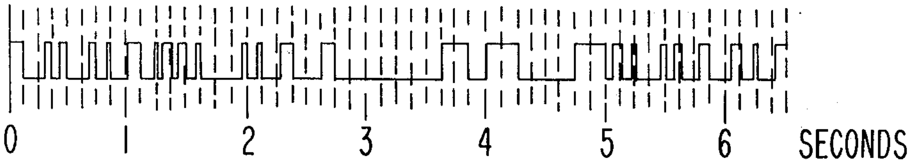
FIG. 6 is the output of the register of FIG. 1.

The waveform of FIG. 6 is essentially the output of the bit register at each sample time. Each vertical line represents one sample time and in the particular embodiment there are eight sample times for each second. As previously indicated, there are up to 80 samples for each signature. In the particular signature illustrated there are approximately 54 samples taken of the signature. Each pulse of FIG. 6 is the binary one output of the bit register and each sample time where there is no pulse represents the binary zero output. By the use of this weighting the signature pattern is arrived for the signature of FIG. 3.

TABLE A

| | | | | | | | | |
|---|---|---|---|---|---|---|---|---|
| SIGNATURE PATTERN | | 10110110 | 11111001 | 10100100 | 00000110 | 11000011 | 11011010 | 1101 |
| DISTRIBUTION WEIGHTING | | ABC CB | ABC CB | ABC FE | DEF CB | ABC CB | ABC CB | ABC |
| | | EDEF C | BABC F | EDEF F | EDEF C | BABC C | BABC C | BABC |
| | | CBABC | CBABC | CBABC | FEDEF | FEDEF | FEDEF | FEDE |
| | | CBABC | CBABC | FEDEF | FEDEF | FEDEF | CBABC | CBA |
| | | FEDEF | CBABC | FEDEF | FEDEF | FEDEF | CBABC | |
| | | CBABC | FEDEF | CBABC | CBABC | FEDEF | FEDEF | |
| | | CBAB C | FEDE F | FEDE F | CBAB C | CBAB C | CBAB C | |
| | LEGEND | FED EF | CBA BC | FED EF | FED EF | CBA BC | FED EF | |
| CONVOLVED SUM | A=+1.00 | .53 | 1.28 | 1.00 | -2.50 | 1.00 | 2.22 | 1.00 |
| | B=+ .61 | .36 | 2.22 | .22 | -2.50 | 1.00 | 1.28 | 1.00 |
| | C=+ .14 | 1.00 | 2.50 | -.22 | -2.50 | -1.00 | .50 | .22 |
| | D=-1.00 | 1.00 | 2.22 | -1.00 | -2.22 | -2.22 | 1.00 | -.22 |
| | E=- .61 | .50 | 1.00 | -1.00 | -1.00 | -2.22 | -1.00 | 1.14 |
| | F= .14 | 1.00 | -.72 | -.50 | .72 | -1.00 | .22 | |
| | | 1.00 | -.72 | -1.28 | 1.00 | 1.00 | .06 | |
| | | .50 | .72 | -2.22 | .50 | 2.22 | .22 | |
| DECIMAL NORMALIZED | | .61 | .76 | .70 | 0.0 | .70 | .94 | .70 |
| | | .57 | .94 | .54 | 0.0 | .70 | .76 | .70 |
| | | .70 | 1.00 | .46 | 0.0 | .30 | .60 | .54 |
| | | .70 | .94 | .30 | .06 | .06 | .70 | .46 |
| | | .60 | .70 | .30 | .30 | .06 | .70 | .27 |
| | | .70 | .36 | .40 | .64 | .30 | .54 | |
| | | .70 | .36 | .24 | .70 | .70 | .51 | |
| | | .60 | .64 | .06 | .60 | .94 | .54 | |
| BINARY NORMALIZED | | 11111111 | 11111001 | 11000000 | 00000111 | 11000011 | 11111111 | 11100 |

Figure 7:
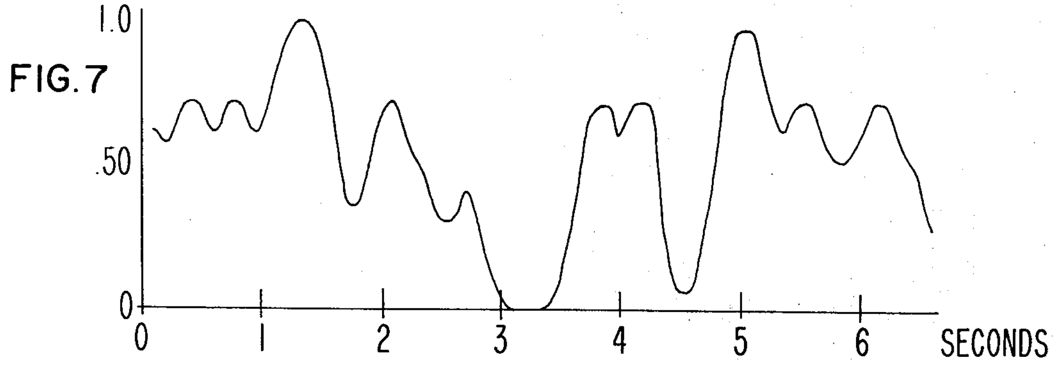
FIG. 7 is the convolved waveform of the signature of FIG. 3.

Referring to Table A above there is shown the convolution process beginning with the signature pattern of 0's and 1's and ending with a decimal normalized sum of the convolved pattern and a binary normalized sum of the convolved pattern. As explained above, the probability of an event occurring in a given column with absolute certainty is equal to one and the probability of no zero crossing occurring in a given column with absolute certainty is mathematically made equal to minus one for the purpose of this embodiment. From this basis the probability of each event happening in the adjacent column is 0.61 and likewise in the second adjacent column, the probability is 0.14. A maximum possible deviation for any given column is a summation of five weighted values and has a numeric value equal to 2.5. With this weighting scheme the maximum possible deviation is plus or minus 2.5 depending upon whether there is a train of zero crossings over a plurality of sample period or a train of no zero crossings which in effect is the pen being removed from the paper. Since the process deals with a negative number, it is desired to normalize the convolved signature pattern to a value between zero and plus 1. This requires that each of the convolved sums have added thereto a value of +2.5 and the result divided by 5 to give the normalized values. In Table A the above-identified process is carried out for the signature illustrated in FIGS. 3–6. The end result of this pattern is plotted in FIG. 7 which illustrates the decimalized normalized waveform of the convolved signature pattern of one Jack E. Koppen. In establishing the reference signature pattern as hereinabove indicated, it would be necessary that this process be repeated and combined for a plurality of signatures in order to arrive at a normalized reference signature pattern.

PROGRAM FORGE 9

Below is a program identified as Forge 9 which is writeen in BASIC language for use on a B5500. This program performs the function of generating the standard signature pattern from five reference signatures.

```
200  PRINT"THIS IS FORGE9: FOR 1 PERSON WITH 5
     SIGNATURES"
300  FILE FG3IN.
400  DIM F(85), K(10,87), M(89),P(10), Q(93), V(10),
     L(10,97),E(20)
800  PRINT"SIMPLE BINARY (1) OR DECIMAL (2)
     REFERENCE PATTERN?"
900  INPUT K9
1100 E(11)=K9
1500 FOR D=1 TO 5
1600 F=D
1700 FOR E=1 TO 10
1800 INPUT   1, G
                                    SMEAR
1900 H=G* 10**(-7)
2000 FOR I=1 TO 8
2100 J=J+1
                                    each
2200 K(F,J)=INT(H)
                                    PATTERN
2300 IF INT(H)=1 THEN P1=J
2510 K(F,J)=2*K(F,J)-1
2520 L(F,J-1)-L(F,J-1)+K(F,J)*.61
2530 L(F,J+1)=L(F,J+1)+K(F,J)*.61
2540 L(F,J+2)=L(F,J+2)+K(F,J)*.14
2550 IF J-2   LT O THEN GO TO 2599
2560 L(F,J-2)=L(F,J-2)+K(F,J)*.14
2599 H=10* (H-INT(H))
2600 NEXT I
2700 NEXT E
2710 For B1=1 TO P1
                                    NORMALIZE
2720 K(F,B1)=K(F,B1)+L(F,B1)+2.5)/5.0
2730 NEXT B1
                                    STORE PATTERN
                                    LENGTH
```

-Continued

```
2800 P(F)=P1
3100 J=O
3300 PL=O
3400 NEXT D
3710 H2=1
3720 FOR K2=1 TO 5
3730 J2=2                           DETERMINE
3740 E1=E1+P(J2)                    AVERAGE
3750 NEXT K2                        LENGTH
3760 F(H2)=INT (E1/5+0.5)
3770 E1=O
3800 G1=1
3900 FOR H1=1 TO 5
4000 J1=H1
4100 FOR K1=1 TO F(G1)              PLACE ALL
                                    SIGNATURES
4200 L1=INT(K1*P(J1)/F(G1)+0.5)     INTO AVERAGE
                                    LENGTH AND
4300 M(K1)=M(K1)+K(J1,L1)           ADD EACH
                                    POINT.
4400 NEXT K1
4500 NEXT H1
FOR
NOR
N1=1
TO F(G1)
4700 IF K9=2 THEN GO TO 5000        BINARY NORMALIZE
                                    STANDARD
4800 Q(G1,N1)=INT(M(N1)/5+0.5)      SIGNATURE
4900 GO TO 5200                     DECIMAL
5000 Q(G1,N1=O.1*INT(10*M(N1)/5+0.5)
     NORMALIZE
                                    STANDARD
5200 NEXT N1                        SIGNATURE
5300 MAT M-ZER(89)
                                    PRINT NORMAL
5400 MAT PRINT Q                    SIGNATURE
5500 END
```

Steps 200 through 400 are general housekeeping steps identifying the several parameters of the program for use in the computer. Steps 800 through 1100 provide the option for generating a binary reference pattern or a decimal reference pattern. In Table A both binary and decimal reference patterns were generated. Steps 1500 and 1600 provide means for identifying each one of the five signatures to be used to generate the reference pattern. Step 1,700 is a step identifying each group of eight bits from a data pattern. As previously indicated, the signature comprises 80 bits of information. As a characteristic of a computer, each decimal word of information available is eight digits long therefore a given signature comprises 10 groups of eight digits each; only the digits 1 and 0 being employed.

Steps 1800 through 2700 perform the function of smearing or convolving each signature pattern as indicated in Table A. Steps 2710 through 2730 perform the function of normalizing the signature pattern amplitude. Step 2800 performs the function of storing the pattern length for future use. Steps 3400 through 3760 perform the function of determining the average length of each of the signature patterns. Steps 3800 through 4500 impose each signature into the average length and take a summation total of each of the intervals contained in the average length of the signature pattern. Steps 4700 and 4800 normalize the reference signature to the binary values of 1 and 0 and steps 4900 and 5200 normalize the reference signature to decimal values between 0 and 1. Step 5400 in the program causes a printout of the normalized signature according to the binary or decimal reference pattern which was selected in step 800.

Once the normalized signature is derived in step 5400 of the above program, the information from that step may be stored on any medium such as a credit card for use in subsequent verifying operations to verify an inquiry signature against the reference signature. In one embodiment the information may be applied to a magnetic tape on a credit card which when read in an apparatus called a verifier will verify or compare the information contained on the credit card with the information generated by the signing or making of a new signature. There is stored on the credit card the average length of the signature in addition to the probability pattern of zero crossings as illustrated graphically in FIG. 7 or stated in the decimal normalized pattern of Table A.

Below are the essential lines of a verify program which is also written in the BASIC language for use in a B5500. However, an equivalent program may be stored in a read only memory in a small apparatus and if so several of the steps in this program are not necessary. These steps are basically the print steps which are not necessary in the verify unit. In step 1950 of the verify program there is stored a value which is a function of the comparison between the reference signature and the inquiry signature. This value is a merit value which when applied against a fixed threshold level within the verifier will indicate to the operator that the inquiry signature does verify or does not verify with the reference signature.

VERIFY PROGRAM

```
200  PRINT "THIS IS VERIFY
300  FILE FORGE9, P(R)
400  DIM F(85),E(20),
500  PRINT "ENTER EXPONENT FACTOR FOR
AMPLITUDE."
550  INPUT Z1
1200  X=0
1300  INPUT NO. 1: ,F
1350  INPUT NO. 2: =P
1400  G2=P(R)/F(L)
1500  X=X+1
1600  FOR T1=-1 TO F(L)
1700  T2=INT(T1*G2+0.5)
1750  Q2=F(L,T1)-P(R,T2)
1800  X1=1-ABS(Q2)
1900  X5=X1**Z1
1950  V1=V1+X5
2000  NEXT T1
2050  PRINT V1
2100  END
```

Step 300 identifies the input file which is the credit card, FORGE9 and the newly written or inquiry signature, P(R). Step 500 sets an exponent which controls the acuteness with which the merit sum is accumulated. Step 1400 forms the length ratio of the inquiry pattern to the reference pattern. Step 1600 is a scanning step scanning the reference pattern bit by bit up to the length of the reference pattern signature. Typically the length of such a signature is less than eighty samples of information. Step 1700 identifies the corresponding position of the inquiry pattern for each of the scan positions in the reference pattern. This step utilizes the ratio figure found in step 1400 for putting the inquiry signature into the same length as the reference signature. Step 1750 is a mathematical step forming the difference of the value of the reference pattern and the inquiry pattern and storing that figure with its resulting sign as factor Q2. Steps 1800 and 1900 work with the factor Q2 and raise it to the exponent factors established in step 550. As previously indicated, step 1950 stores the figure of merit as a result of the comparison between the two signatures. When T1 is equal to the length of the reference signature the program ends and the verifier unit indicates in some manner such as by a light or by a value to the operator whether or not the inquiry signature and the reference signature are substantially the same.

There has thus been disclosed and described a method and apparatus for establishing a representation of a reference signature from a plurality of substantially identical signatures. The standard or reference signature may be represented in binary form as a series of ones and zeros or in decimal form with values between zero and one. In the particular embodiment the signature patterns are representations of pressure levels as determined from the making of a signature and more particularly represent zero crossing characteristics of the resultant analog electrical signal generated by the pressure pattern. The standard or reference signatures are convolved into a pattern which is representative of a probability curve that a particular zero crossing will occur at a given point in time of an inquiry signature. An apparatus is described to show the comparison between the reference signature and an inquiry signature for determination whether or not the two signatures are substantially equivalent.

Also disclosed herein are excerpts from two programs written in the BASIC language for use on a B5500 for generation of both the reference signature and for verifying an inquiry signature against the reference signature.

What is claimed is:

1. A system for storing in binary form the time versus pressure relationship of a signature for use in a signature verification system comprising:

transducer means for converting the inquiry signature into an analog electrical signal in response to the pressure exerted during the writing of the inquiry signature;

zero crossing indicating means for generating a pulse indicating each positive zero crossings of said analog electrical signal as a pulse;

a pulse counter for counting a predetermined number of pulses;

a clock pulse generator responsive to said zero crossing indicating means for generating a synchronous string of timing pulses to count said pulse counter, and responsive to said pulse counter for halting said timing pulses when said predetermined number is reached;

register means responsive to said clock pulse generator and said zero crossing indicating means for generating a binary output pulse representative of the time versus pressure relationship of a signature;

transfer logic responsive to said register means;

a card punch responsive to said transfer logic for storing on a card medium the binary representation of a signature; and timing means responsive to said clock pulse generator and said card punch for causing said transfer logic to transfer the contents of said register means to said card punch.

2. The system in claim 1 wherein said zero crossing indicator means includes:

a limiting amplifier for sensing the occurrence of each positive zero crossing signal from said transducer means and wherein said register means is a flip flop responsive to a positive going signal from said limiting amplifier and a set signal from said clock pulse generator operative to generate a binary signal representing a signature.

* * * * *